United States Patent [19]

Weidenmann et al.

[11] Patent Number: 5,567,315

[45] Date of Patent: Oct. 22, 1996

[54] LIFTING-LOWERING TYPE AQUARIUM FILTER

[75] Inventors: Walter Weidenmann, Deizisau; Frank v. Luetzau, Bietigheim; Gerhard Frank, Esslingen; Michael Schmidt, Herrenberg; Ferdinand Mayer, Schwaebisch Gmuend; Ulrich Herold, Oberboihingen, all of Germany

[73] Assignee: Eheim GmbH & Co. KG., Deizisau, Germany

[21] Appl. No.: 408,912

[22] Filed: Mar. 22, 1995

[30] Foreign Application Priority Data

Mar. 26, 1994 [DE] Germany ............... 44 10 562.2

[51] Int. Cl.⁶ ............................................. A01K 63/04
[52] U.S. Cl. .................. 210/123; 210/184; 210/169; 210/416.2; 210/472; 119/262
[58] Field of Search ................... 210/123, 125, 210/126, 128, 169, 416.2, 184, 472; 119/259, 260, 261

[56] References Cited

U.S. PATENT DOCUMENTS

| | | | |
|---|---|---|---|
| 4,601,821 | 7/1986 | Sherman et al. | 210/169 |
| 4,944,871 | 7/1990 | Ogawa | 210/169 |
| 5,160,607 | 11/1992 | Thiemer et al. | 210/169 |
| 5,242,582 | 9/1993 | Marioni | 210/169 |
| 5,277,800 | 1/1994 | Dieckmann et al. | 210/169 |
| 5,292,431 | 3/1994 | Romagnoli | 210/169 |

FOREIGN PATENT DOCUMENTS

| | | |
|---|---|---|
| 0295149 | 12/1988 | European Pat. Off. . |
| 0453804 | 10/1991 | European Pat. Off. . |
| 0484896 | 5/1992 | European Pat. Off. . |
| 0558807 | 9/1993 | European Pat. Off. . |
| 2700030 | 2/1982 | Germany . |
| 3136383 | 3/1983 | Germany . |
| 40133324 | 10/1991 | Germany . |
| 2141040 | 12/1984 | United Kingdom . |

Primary Examiner—Robert Popovics
Attorney, Agent, or Firm—Michael J. Striker

[57] ABSTRACT

A filter for aquarium operating in accordance with the lifting-lowering principle comprises a housing with at least one filter compartment for a filter material, a pump which aspirates water after passing through the filter compartment through a suction conduit and supplies the water back into an aquarium, at least one auxiliary chamber supplied with water and a float-controlled valve device controlling an outlet of the auxiliary chamber and communicating with the suction conduit, an auxiliary housing in which the auxiliary chamber is provided and supplied with water filtered after passing of the filter compartment in accordance with the principle of communicating pipes. A passage which is connected with the suction conduit has a valve opening which is alternatingly closeable and openable by a float-controlled valve closing member of the valve device. In another embodiment, a supply is formed as a passage which passes through the filter compartment and is sealed from the latter and opens in a bottom chamber provided in the housing under a lowermost one of the filter compartments, so that the aspiration of the supplied water is performed from below and from the bottom chamber through the filter compartment upwardly with accompanying filtering.

73 Claims, 6 Drawing Sheets

LIFTING-LOWERING TYPE AQUARIUM FILTER

BACKGROUND OF THE INVENTION

The present invention relates for a filter for aquariums.

One of such filters is disclosed, for example in U.S. Pat. No. 5,160,607 (German patent document DE-OS 40 13 324), and operates as an alternating lifting-lowering filter. This operation based in the known filter on the fact that each individual filter compartment has at least one overflow suction lift device which operates on the principle of the lift loop. Its inlet is located at the bottom side and therefore substantially at the height of the bottom of the filter compartment and its outlet opens downwardly toward the following filter compartment. The outlet of the overflow suction lift device opens in the lowermost filter compartment in a bottom chamber into the interior of the filter housing. With this design of the filter, a multi-stage operational sequence of the filtering is performed. The control of the cyclical lifting-lowering process is performed without special mechanically movable parts. For high filter outputs no limits is set. The known filter is suitable predominantly as an inner filter, while its use as an outer filter is also desirable. However, certain adjustments are needed for this application. For this purpose in the known filter an auxiliary chamber is formed which forms a throughgoing passage with individual tubular elements extending through the filter compartments located over one another to provide protection from a dry running of the pump. It is connected with an upper water supply of the filter so that when needed, unfiltered water flowing directly from the aquarium tank can be flow into the auxiliary chamber. The downwardly located outlet of this passage is controllable by a float-controlled valve device. It is located in a bottom chamber in the filter housing formed under the lowest filter compartment and placed in a motor-driven suction pump having a pressure side connected with the outlet pipe for supplying back to the aquarium tank the filtered water aspirated from the bottom chamber. The float-controlled valve device located inside the bottom chamber starts operating only when the water level in the bottom chamber, due to a defect or a faulty operation, is so low that there is the danger that the pump which aspirates water from the bottom chamber runs dry. The valve device has a float ball arranged in a cage and floating in the bottom chamber in the case of sufficient water level so as to pump from below upwardly toward the downwardly located outlet of the auxiliary chamber and thereby constantly closing the same. Only in the case of a very low water level in the bottom chamber and therefore faulty buoyancy for the float ball it falls due to gravity force so that the outlet of the auxiliary chamber is released and thereby a connection is produced with the bottom chamber. Thereby the pump now can aspirate the unfiltered water from the aquarium tank through the auxiliary chamber and through its outlet into the bottom chamber to prevent a dry running. The auxiliary chamber with the valve device forms in this filter an emergency device which normally does not operate and has nothing to do with the desired alternating lifting-lowering operation.

Another filter is disclosed in the German document DE-PS 27 00 030 which also operates as an alternating lifting-lowering filter, but however is formed not in the same way. This filter is connected with the aquarium tank through a supply conduit. It has only one filter compartment. A bottom chamber is formed in the filter housing under the filter compartment, and a reverse U-shaped conduit with a free tubular end opens into the bottom chamber. A pump is provided in the conduit and aspirates water accumulated there from the bottom chamber to supply the water into the tank through a return conduit leading toward the aquarium tank. For safety reasons for the case of stoppage of the filter compartment, a bypass conduit is provided between the space located above the filter compartment, where the supply is performed, and the bottom chamber. Therefore with the clogged filter compartment, the upwardly supplied water can flow unfiltered through the supply conduit downwardly into the bottom chamber. During aspiration of the water from the bottom chamber through the open end of one leg of the U-shaped structure, the water level in the filter compartment lowers downwardly. The discharge quantity per unit time is greater than the supply quantity per unit time. Because of this device, a lifting-lowering operation is performed. The filter is however complicated as to the device for actuating the lifting-lowering function, since the reverse U-shaped tube connected with the pump extends through the filter mass in the filter compartment with both legs. In addition the filter mass in the filter compartment is also pierced through by the bypass conduit with concomitant problem arising when the one leg of the U-shaped structure extends through the bypass conduit.

SUMMARY OF THE INVENTION

Accordingly, it is an object of the present invention to provide a filter for aquariums which avoids the disadvantages of the prior art.

More particularly, it is an object of the present invention to provide a filter for aquariums, in which the arrangement for activating the lifting-lowering operation is designed simply and inexpensively, can be dismounted when necessary in a fast and simply manner and replaced and provides a high filter output.

In keeping with these objects and with others which will become apparent hereinafter, one feature of the present invention resides, briefly stated, in a filter for aquariums, in which the auxiliary chamber is formed in an auxiliary housing and supplied with filtered water after passing at least one filter compartment in accordance with the principle of communicating pipes, and has a valve opening which is alternatingly closeable and openable by a valve closing member of a valve device controlled by a float, wherein the valve opening is provided in a passage which is connected with a suction conduit.

Since the auxiliary chamber is located in an auxiliary housing, it can be removed fast and simply when needed for example for cleaning and then mounted again. The lifting-lowering operation is obtained in this filter by a float-controlled valve device in the auxiliary chamber for providing a continuous exchange of the operation, so that the filtered water is supplied into the auxiliary chamber. Thereby the auxiliary chamber and the float-controlled control device can be purified from dirt particles entrained in water, since it is filtered before during the filtering process. The filter is operation-reliable to a higher degree and is characterized by a long operation. It provides a high throughput and a high filtering efficiency.

In accordance with another feature of the present invention the supply of the filter is formed of a passage which extends through at least one filter compartment and closed relative to it as well as open into a bottom chamber in the housing located under the lowest filter compartment, and the suction of the supplied water is performed from below and from the bottom chamber through at least one filter compartment upwardly with concomitant filtering.

Such a filter operates without a lifting-lowering operation. The filter can be designed as a simple, compact and price-favorable device and utilizes substantially the same components as the first mentioned filter with the lifting-lowering operation. Therefore both filters which have different operations can be formed substantially with the same components. This filter is simple and first of all inexpensive, since it can be produced with at least substantially the same components as a filter with the lifting-lowering operation. The costs are therefore substantially reduced, since for manufacturing of individual components only insignificantly modified tools are needed and therefore additional tool costs are dispensed with.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
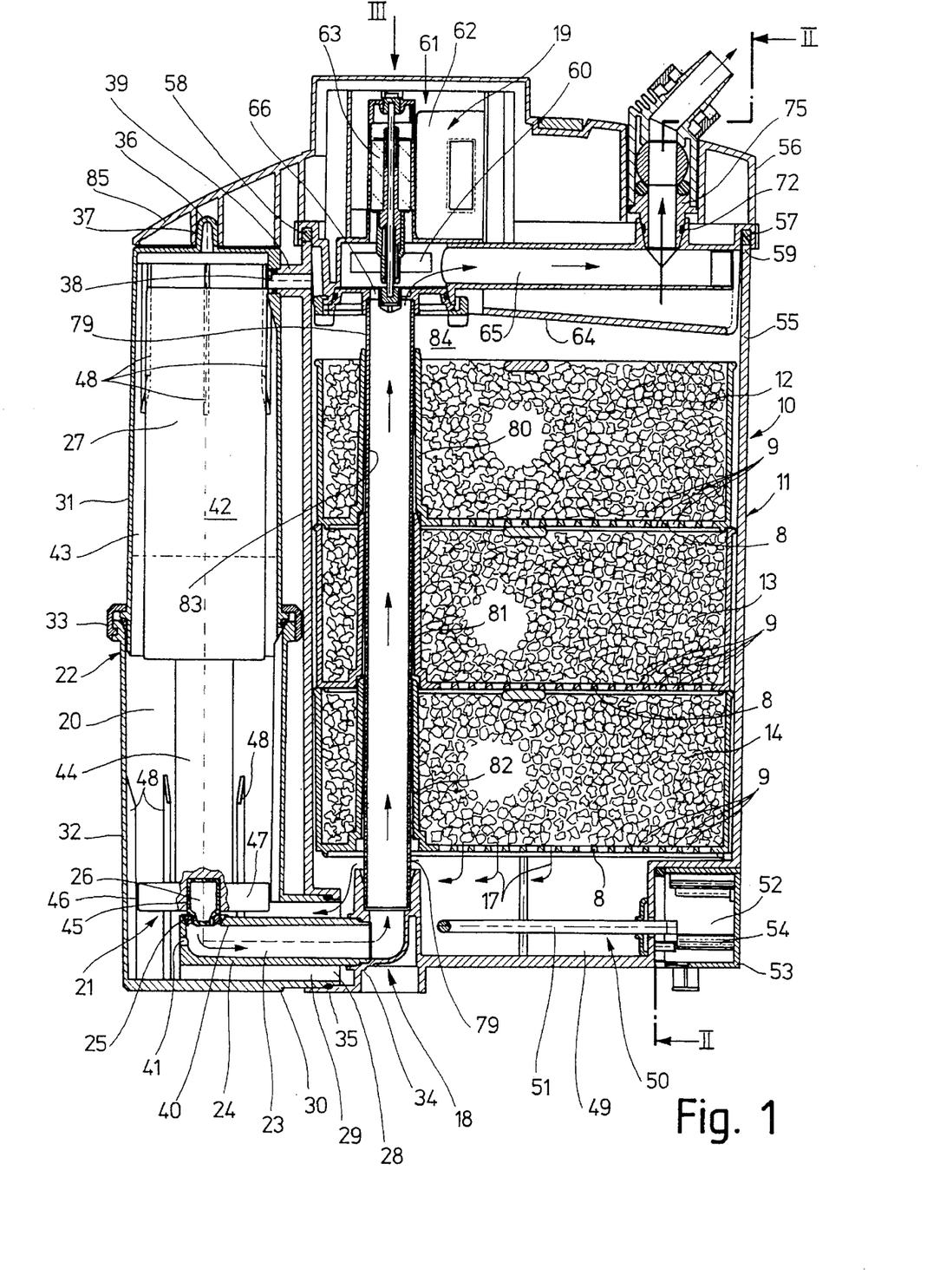
FIG. 1 is a view schematically showing a vertical cross-section along the line I—I in FIG. 2 through a filter for aquariums in accordance with the first embodiment of the present invention.
Figure 2:
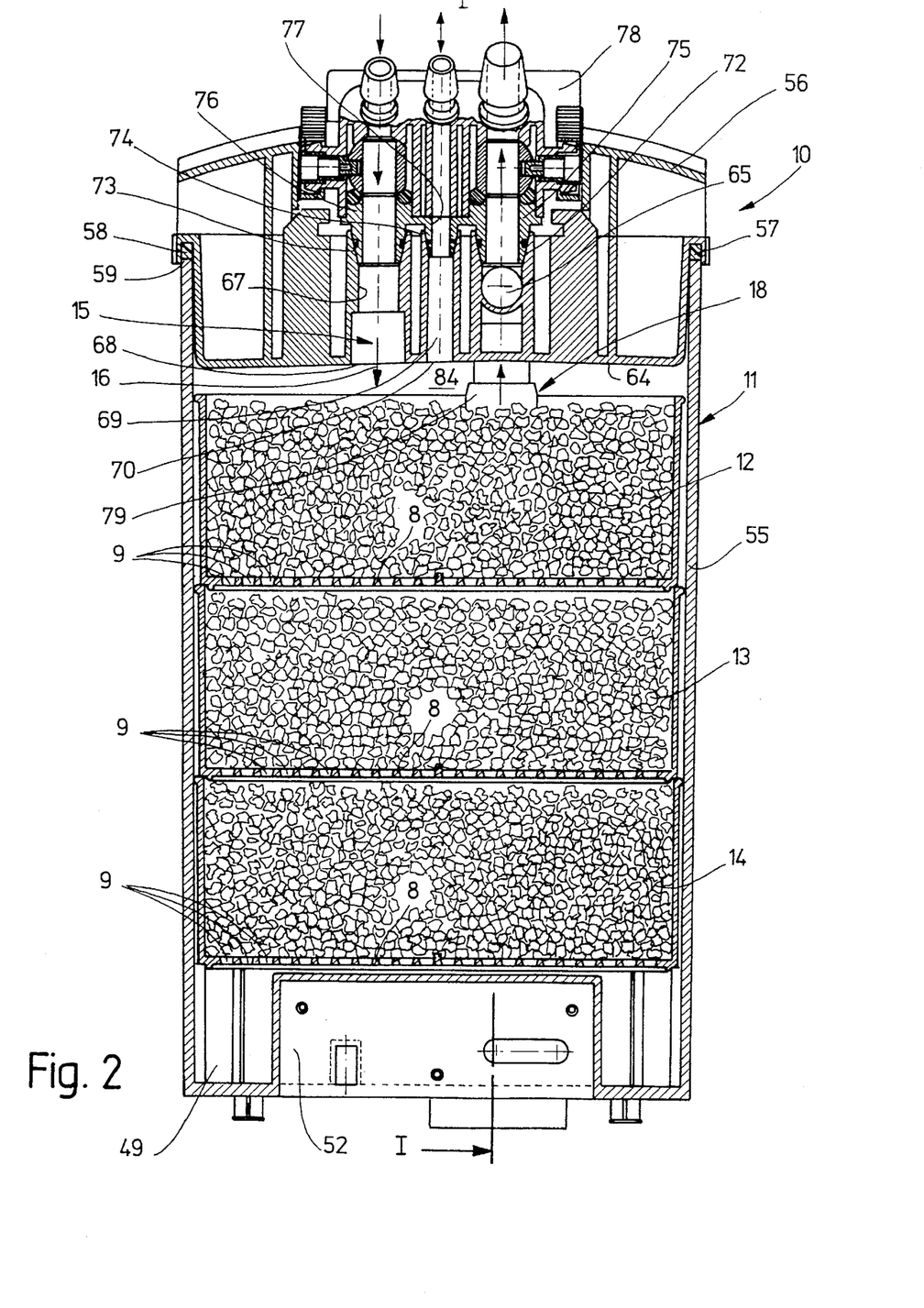
FIG. 2 is a schematic side view with the vertical section along the line II—II in FIG. 1.
Figure 3:
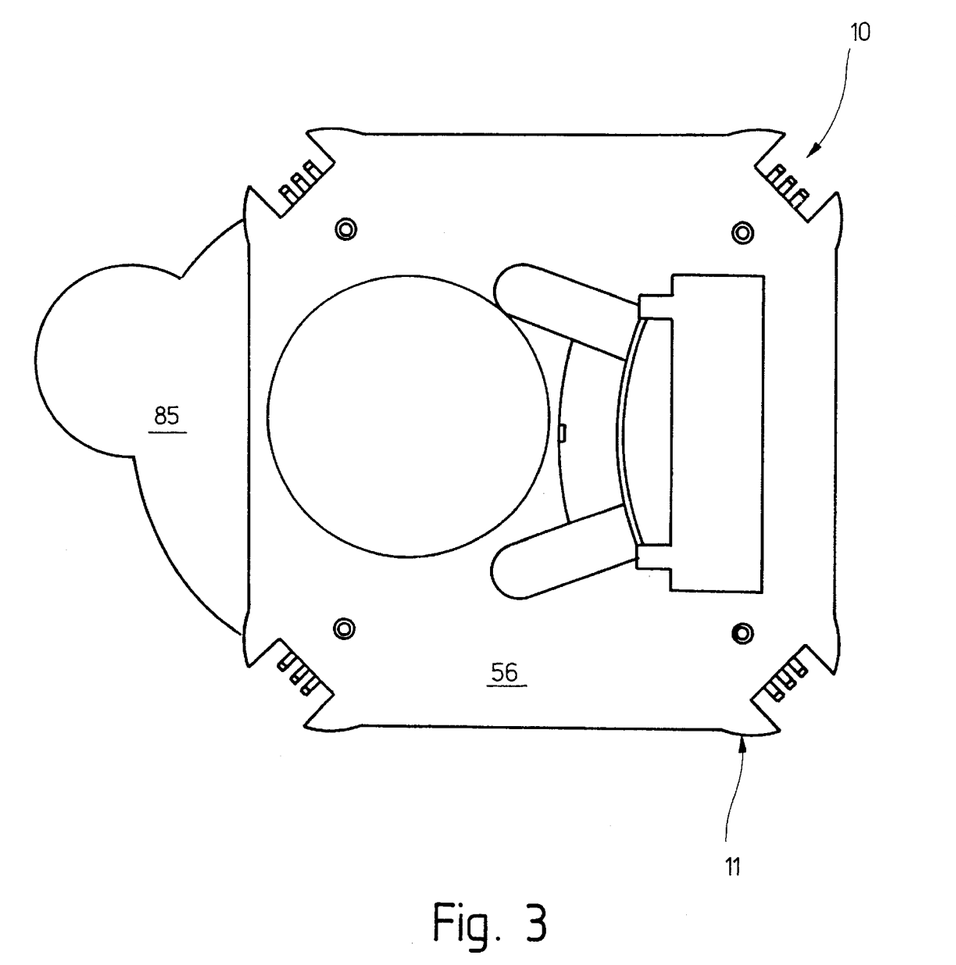
FIG. 3 is a schematic plan view of the filter in direction of the arrow III in FIG. 1, however without an upwardly inserted closing device.

FIGS. 1–3 schematically show a filter 10 for aquariums in accordance with the first embodiment of the invention which is formed in particular as an outer filter to be connected through corresponding hoses with a not shown aquarium tank.

The filter 10 has a housing identified with reference numeral 11 and having a substantially four-cornered, in particular substantially parallelepipedic contour. The housing 11 is composed for example of a synthetic plastic material. At least one filter compartment for a filter material is provided in the housing 11. In the shown embodiment there are three filter compartments 12, 13, 14 arranged vertically over one another and provided with a filter material such as for example a stone, gravel and the like. The individual filter compartments 12, 13, 14 are placed over one another and can be removed upwardly after one another from the housing 11.

The filter compartment 12 is supplied with water through a supply 15 from above in direction of the arrow 16, which water is supplied from the not shown aquarium tank. The water passes the filter compartments 12, 13, 14 in a vertical direction in accordance with the arrow 17 and is aspirated through a suction conduit 18 by the pump 19 and supplied back into the not shown aquarium tank. The pump returns the aspirated water through a corresponding conduit into the aquarium tank.

The filter 10 operates as an alternating lifting-lowering filter similar to the filter disclosed in the German reference DE-OS 40 13 324 (U.S. Pat. No. 5,160,607). The specific operation of such an alternating filter-lowering filter and in particular intense oxygen enrichment provided by it is disclosed in the preceding text, so that its repetition should be superfluous.

The filter 10 has at least one auxiliary chamber 20 supplied with water. The outlet of the auxiliary chamber 20 located below in FIG. 1 communicates with the suction conduit 18 and is controllable by a float-controlled valve device identified with reference numeral 21.

A substantial feature of the filter 10 is that the auxiliary chamber 20 is formed in an auxiliary housing 22 and supplied with water in accordance with the principle of communicating pipes, which water is filtered after passing the compartments 12, 13, 14. Only such water arrives in the auxiliary chamber 20 which has been already filtered.

The auxiliary chamber 20 has a passage 23 formed in a tubular portion 24 which for example is cornered or round, and connected with the suction conduit 18. The passage 23 in the auxiliary chamber 20 has a valve opening 25 cooperating with a valve closing member 26 of the valve device 21 and openable and closeable by the valve closing member. The valve closing member is controlled by a float 27 arranged in the auxiliary chamber 20 and connected with the valve closing member.

The auxiliary chamber 20 has at least one supply opening 28 so that the auxiliary chamber 20 communicates through it with the housing 11 of the filter 10 and filtered water is permanently supplied into the auxiliary chamber 20. The supply opening 28 is connected with a conduit 29 formed for example of a cornered or rounded tubular part 20 and opening below the lowest filter compartment 14 into the interior of the housing 11.

The tubular portion 24 in the passage 23 extends into the interior of the tubular part 30 and is surrounded by the latter at a distance so as to form for example a radial passage of the conduit 29. The passage 23, in particular the tubular portion 24 and/or the conduit 29, in particular the tubular part 30, are formed of one piece with the auxiliary housing 22 as shown in FIG. 1. The tubular portion 25 and the tubular part 30 extend substantially horizontally, while the remaining part of the auxiliary housing 22 extends substantially vertically. The auxiliary housing 22 is tubular and composed of two coaxially connected tubular halves 31 and 32. The lower tubular half 32 has a one-piece, substantially rectangularly extending tubular portion 24 and the outer tubular part 30. Both tubular halves 31, 32 are releasably connected with one another, and the outer tubular half 31 engages from above with the inner end in the lower tubular half 32. Both tubular halves 31, 32 are connected by a connecting device 33, for example a ring, with interposition of a seal.

The auxiliary housing 22 is releasably placed on the housing 11 of the filter 10 and connected with it. The housing 11 of the filter 10 is provided on a lower end of the suction conduit 18 in FIG. 1 with a first connecting part 34 and further with a concentric second connecting part 35. Each connecting part 34, 35 is tubular and corresponds to the diameter of the tubular portion 24 or the tubular part 30. The tubular portion 24 is connected with its end with interposition of a seal with the first closing part 34 and in particular is insertable into the latter. The tubular part 30 is connectable with its end with interposition of a seal to the second closing part 35, in particular is insertable in the latter. In this manner, the connection of the auxiliary housing 22 with the housing 11 of the filter 10 is provided in the lower region. The upper end of the auxiliary housing 22 in FIG. 1 has a pin-shaped projection 36 engaging into an upper receptacle 37 of the housing 11 in a form-locking manner. In this upper end region the auxiliary housing 22 has a ventilating opening 38 in the wall of the tubular half 31 for connecting the auxiliary housing 22 to an upper ventilating pipe 39 of the housing 11, which opens into the interior of the housing 11. Here also the connection is performed releasably and by means of a plug-connection with interposition of a seal. Therefore the auxiliary housing 22 is connectable with the housing 11 releasably with the housing 11 to sealingly form the corresponding passages.

The valve opening 25 is formed in a wall 40, preferably in the upper wall of the passage 23, in particular of the tubular portion 24. The passage 23, in particular the tubular portion 24, also has at least one bypass opening 41 for permanently connecting the passage 23 with the auxiliary chamber 20 in the auxiliary housing 22 and for aspirating through the suction opening 18 a minimal water suction quantity. Therefore the dry running of the pump 19 is prevented. It can be seen that the valve opening 25 or the passage 23 has a substantially greater throughflow cross-section than the bypass opening 41. The throughflow cross-section of the valve opening 25 is determined relative to that of the bypass opening 41, so that with consideration of the float 27 and the valve closing member 26, in particular the buoyancy of the latter, the alternating lifting-lowering operation is provided. This operation will be explained in detail later on.

The float 27 is composed of a cylindrical body 42 of relatively light material with high buoyancy properties, and swimmingly held in the auxiliary chamber 20. The cylindrical body 42 has a cross-section which for example is only insignificantly smaller than the cylindrical inner chamber 43 of the tubular auxiliary housing 22, in particular the tubular halves 31, 32. The float 27, in particular the cylinder body 42 carries a coaxial support 44 extending downwardly in FIG. 1, and as the valve closing member 26 a coaxial cylinder element 48 is formed of one piece or can be inserted into the support and mounted in it. The support 44 is formed for example as a rod. A guiding element 46 is held on the support 44 near the valve closing member 26, in particular the cylinder element 45. It is composed for example of a guiding disc 47 which is centered and guided in a substantially cylindrical inner chamber 43 of the tubular auxiliary housing 22. The float 27, in particular the cylindrical body 42 also is centered and guided in the interior of the auxiliary housing 22. Inner guiding parts 44 are provided for guiding the same, and formed for example as guiding rods located in a peripheral direction for example at identical peripheral angular distances.

The housing 11 of the filter 10 has an outwardly closed bottom chamber 49 under the lowermost filter compartment 14. The filtered water is supplied into the bottom chamber 49 after passing the filter compartments 12, 13, 14. The auxiliary chamber 20 permanently communicates with the bottom chamber 49 through the supply opening 28 of the conduits 29, in particular the tubular part 30.

A heating device 40 is arranged in the bottom chamber 9 when needed by the user in accordance with the first embodiment of the invention. It has in particular an electrical heating cartridge 51. The housing 11 of the filter 10 has a hollow chamber 59 provided at the height of the bottom chamber 29 on an outer peripheral side and closeable by a cap 53. A holder of the heating device 50 and an electrical or electronic control device 40 for the heating device 50 schematically shown in FIG. 1 are received in the hollow chamber 52.

If no heating device 50 is needed for the filter 10, it can be dispensed with together with the control device 54. The cap 53 can be fixed in this case, for example by glueing, welding and the like. The construction of the filter 10 provides the possibility for installing an electrical heating device 50 and a control device 54 later on when needed.

Each filter compartment 12, 13, 14 has a bottom 8 formed as a filtering element and provided with passages 90. It is formed for example as a grate.

The housing 11 of the filter 10 is composed of two parts. It has a substantially cup-shaped lower part 55 and a cover 56 placed on it. The filter compartments 12, 13, 14 are insertable in the lower part 55 and releasably retained in it. The cover 56 serves for upwardly closing the lower part 55 and for this purpose can be placed on it and releasably fixed to it. The cover 56 is connectable with the lower part 55 releasably by a closure member located on the lower part 56 non-removably, for example by a closure bracket. An axially compressible seal 57 is arranged between the cover 56 and the lower part 55 and can be formed as a shaped sealing ring. The seal 57 is received in a groove 55 of the cover 56, which opens toward the lower part 55. An upper edge part 59 of the lower part 55 can be substantially form-lockingly engaged in the groove 58 which contains the seal 57 during placement of the cover 56.

The cover 56 and/or the lower part 55 and/or the auxiliary housing 22 are composed of a synthetic plastic material. The cover 56 contains at least one part of the suction opening 18. In the cover-side region of the suction conduit 18, an impeller 66 of the pump 19 is located. The cover 55 has the pump 19 in a special region. The pump is connected with an electric motor 61 for driving the impeller 60, which is composed of a stator 62 and a rotor 63. A substantially horizontal outlet passage 65 extends in the cover 56 above a cover wall 64 which limits a lower side of the cover. The outlet passage 65 forms a part of the suction conduit 18. The cover wall 64 in the region of the impeller 60 of the pump 19 located above, is provided with at least one suction opening 66 communicating with the outlet passage 65 of the suction conduit 18.

The cover 56 further has a supply passage 67 as a part of the supply 15. The supply passage 67 opens into a supply opening 68 provided in the cover wall 64. In addition to the supply passage 67, the cover 56 has a ventilating passage 69 which opens toward the lower side of the cover and has an end side ventilation opening 70 provided in the cover wall 64 and opening there. The ventilation passage 69 is designed so that when not needed, such as for example in the second embodiment shown in FIGS. 4–6, it is closed or closable, for example by a blind plug 71 schematically shown in FIG. 5.

The outlet passage 65 provided in the cover 56 and/or supply passage 66 and/or ventilation passage 69 each have a receptacle 72, 73, 74 correspondingly in the cover 56, which serve as a connection of the insertable outlet pipe 75 or supply pipe 76 or ventilating pipe 77 arranged for example in a connecting device 78.

It can be seen from FIG. 1, that the cover wall 64 raises inclinedly from the right outer side to at least a suction opening 66 under the impeller 60. The cover 56, depending on the design of the filter 10, is in a position as shown for example in FIGS. 1–3 for the first embodiment. Instead it can be in another position as shown for example in the second embodiment of FIGS. 4–6 and turned relative to the first position by 180° inside the cover plate, to be placed on the lower part 55. The cover 56 is useable simultaneously with two different embodiments of filter 10 and 110.

In the first embodiment of the filter 10 in FIGS. 1–3 a pipe 79 is connected with at least one suction opening 66 in the region under the impeller 60 in the cover wall 64. The pipe 79 extends approximately completely over the height of the lower part 55 and a part of the suction conduit 18. The pipe 79 passes through the filter compartments 12, 13, 14 and closes them relative to one another. Each filter compartment 12, 13, 14 has a tubular part 80, 81, 82 which is one piece with it. With the placement of the filter compartments 12, 13, 14 over one another they are connected with one another and form a throughgoing tubular passage 83. The pipe 79 extends through the tubular passage 83. The pipe 79 with its lower end in FIG. 1 is connected with a first closing part 34 of the housing 11 in which the end of the pipe 79 engages. In this manner the inner passage of the pipe 79 is connected with the passage 23, in particular the tubular portion 24, and forms with it a part of the suction opening 18.

The supply opening 68 in the cover wall 64 freely opens into the space 84 provided between the cover wall 64 and the lower part 55 in its upper region. For ventilating the auxiliary chamber 20 it communicates through the ventilation opening 38 and the ventilation pipe 39 with the auxiliary chamber 20, and for ventilation is ventilated outwardly through the ventilation opening 70 and the ventilation passage 69 and communicates with the surrounding area through the ventilation pipe 77 and a further not shown hose connected with it. The space 84 is supplied through the supply opening 68 with water which flows through the supply pipe 76 and the supply passage 67 from the aquarium tank, so that the water can pass successively from above downwardly through the filter compartments 12, 13, 14 and can be filtered there.

The filter 10 in accordance with the first embodiment shown in FIGS. 1–3 operates as follows. The water supplied from the aquarium passages through the filter compartments 12, 13, 14 and lows into the bottom chamber 49. Through the supply opening 28 of the conduit 29, the auxiliary chamber 20 is connected with the interior of the housing 11 in form of a communicating pipe, so that the water also is accumulated in the auxiliary chamber 20. The water quantity supplied to the filter 10 through the supply opening 68 is greater than the water quantity which is aspirated with the closed valve device 21 in FIG. 1 through the bypass opening 41 into the passage 23 and then through the supply conduit 18 by the pump 19. Due to this, the in-flowing water raises the water level in the housing 11 of the filter and correspondingly in the auxiliary chamber 20. The water level is raised therefore in the system. When with the raising water level the buoyancy of the float 28, in particular the cylindrical body 42, is sufficiently high, the float 28 floats high and the valve closing member 26 is lifted over the support 44, so that the valve opening 25 in the wall 40 of the tubular portion 24 is released. Thereby the auxiliary chamber 20 can be emptied suddenly through the valve opening 25 having a relatively great throughflow cross-section and through the passage 23 and the suction conduit 19. The water level in the housing 11 and in the auxiliary chamber 20 drops. The lowering operation is therefore performed. This sudden emptying of the housing 11 and the auxiliary chamber 20 is obtained since the valve opening 25 is formed so great that with the released valve opening 25, a greater water quantity can pass through than the water quantity supplied through the supply opening 68 of the supply 15. The dropping water level in the housing 11 and in the auxiliary chamber 20 leads to the situation that the float 27 together with the valve closing member 26 lower until the valve closing member 26 closes again the valve opening 25 as shown in FIG. 1. This closing step is supported at the end by the suction action of the pump 19.

The valve device 21 is now closed. The cycle starts again in that, the water which flows in through the supply 15 provides a continuously raising water level in the housing 11 and in the auxiliary chamber 20, which corresponds to the lifting operation.

The filter 10 in this construction is compact, operationally reliable, and assembled from only a few inexpensive and functionally reliable components. For cleaning purposes or for similar reasons, the cover 56 can be released fast and simple from the lower part 55 and removed. Therefore the laterally arranged auxiliary housing 22 can be removed without problems. Also, the filter compartments 12, 13, 14 can be lifted in the same simple way and removed upwardly. The pipe 79 is fixedly mounted either in the region of the suction opening 66 of the cover 56 so that during removal and tightening of the cover 56 it is automatically removed with it, or it is just blocked so that during lifting of the cover 56 with the remaining pipe 79, the pipe 79 is pulled out upwardly. In the above described filter 10 it is advantageous when the housing 11 and the auxiliary chamber 20 is composed of a transparent material, and therefore the constant lifting-lowering operation and thereby the disturbance-free operation of the filter 10 can be observed from outside.

As can be seen from FIG. 3, the cover 56 has a laterally extending part 85 projecting over the upper end of the auxiliary housing 22. This part can be formed as a separate element which is mountable on the cover 56 when needed so that the part 85 is placed on the cover 56 when a filter 10 in accordance with the first embodiment of FIGS. 1–3 is provided with the above discussed auxiliary housing 22 and the other components in their cooperation.

Figure 4:
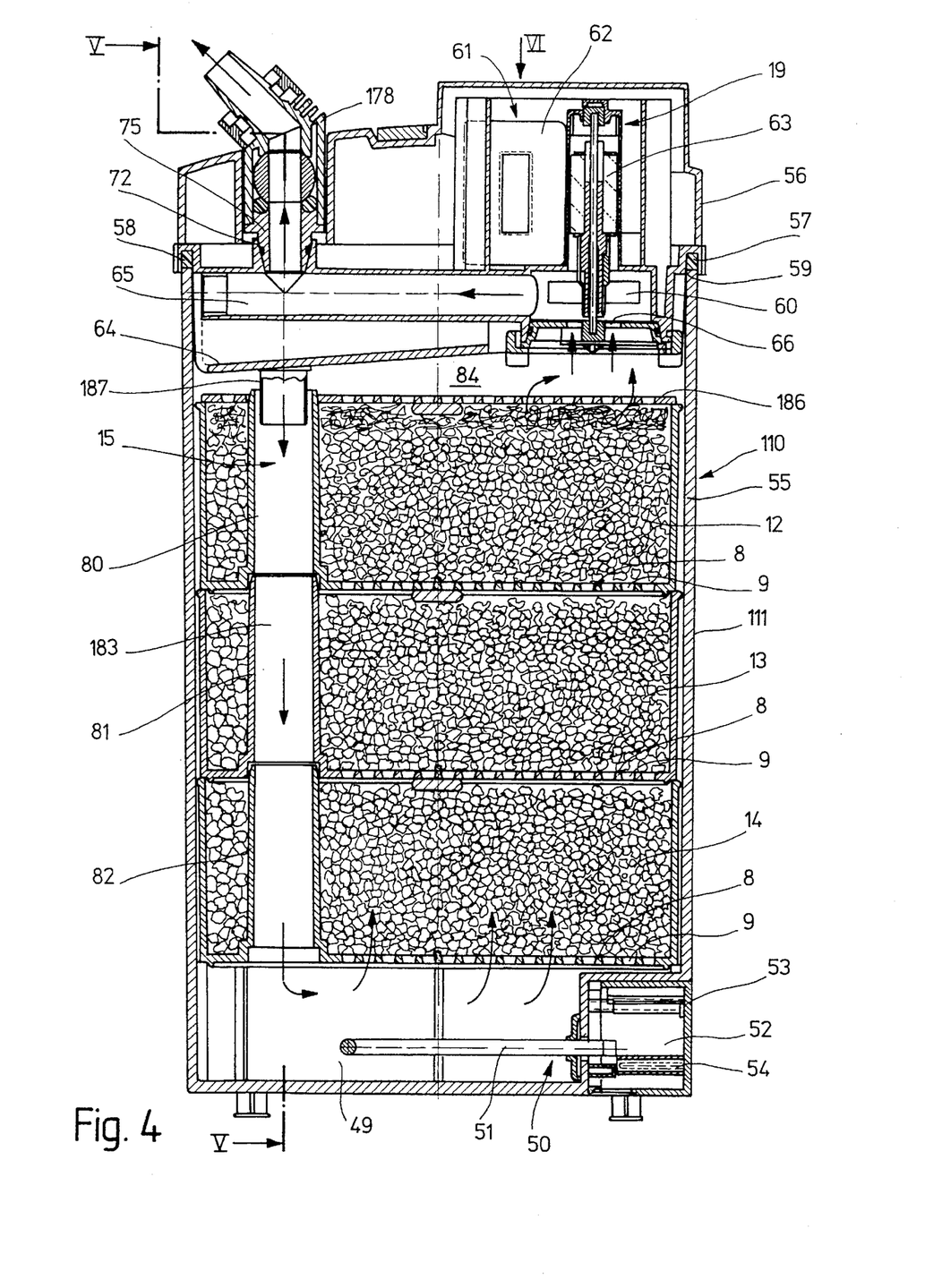
FIG. 4 is a schematic vertical section along the line IV—IV in FIG. 5 of a filter for aquariums in accordance with the second embodiment of the present invention.
Figure 5:
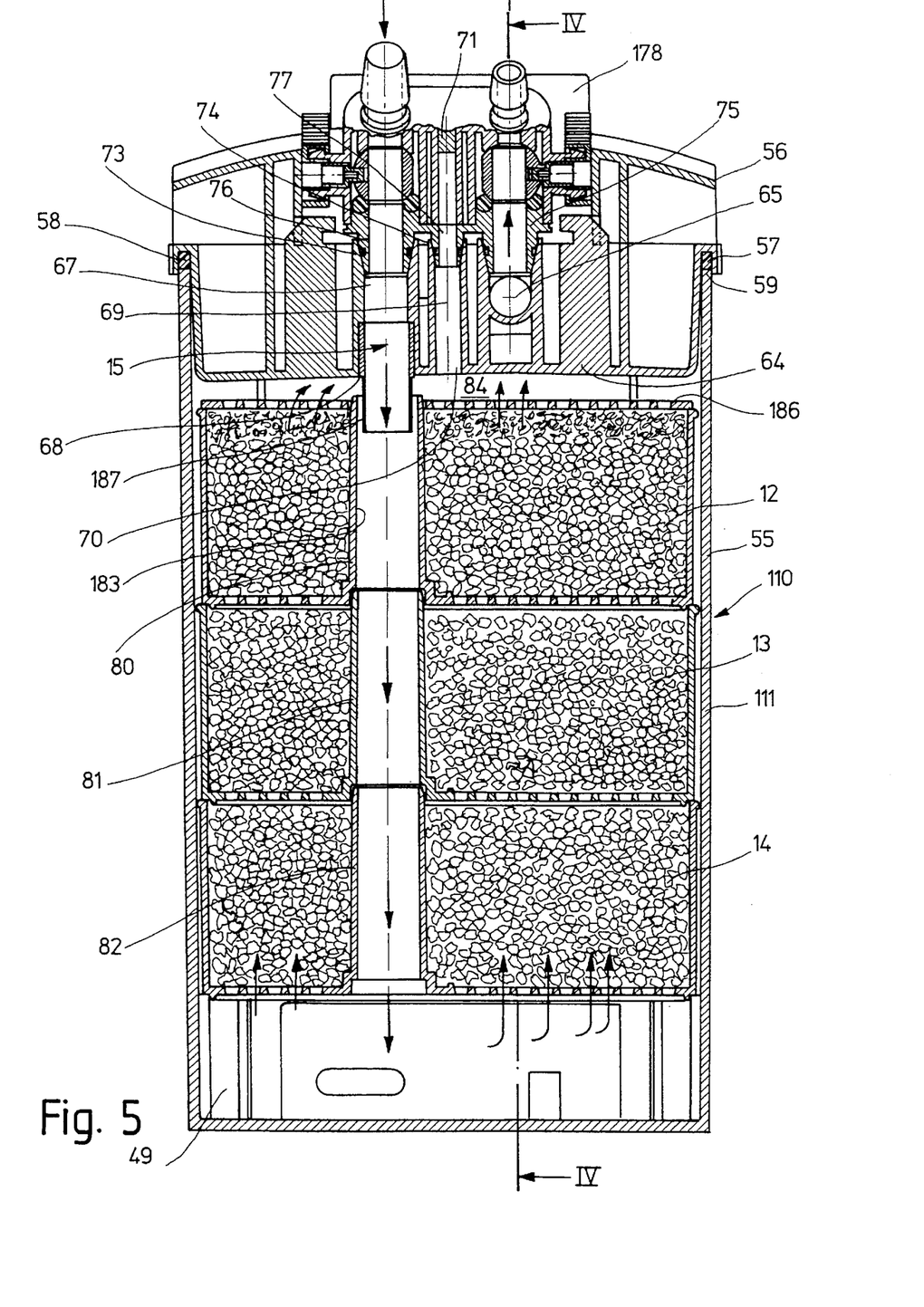
FIG. 5 is a schematic side view with a vertical section along the line V—V in FIG. 4.
Figure 6:
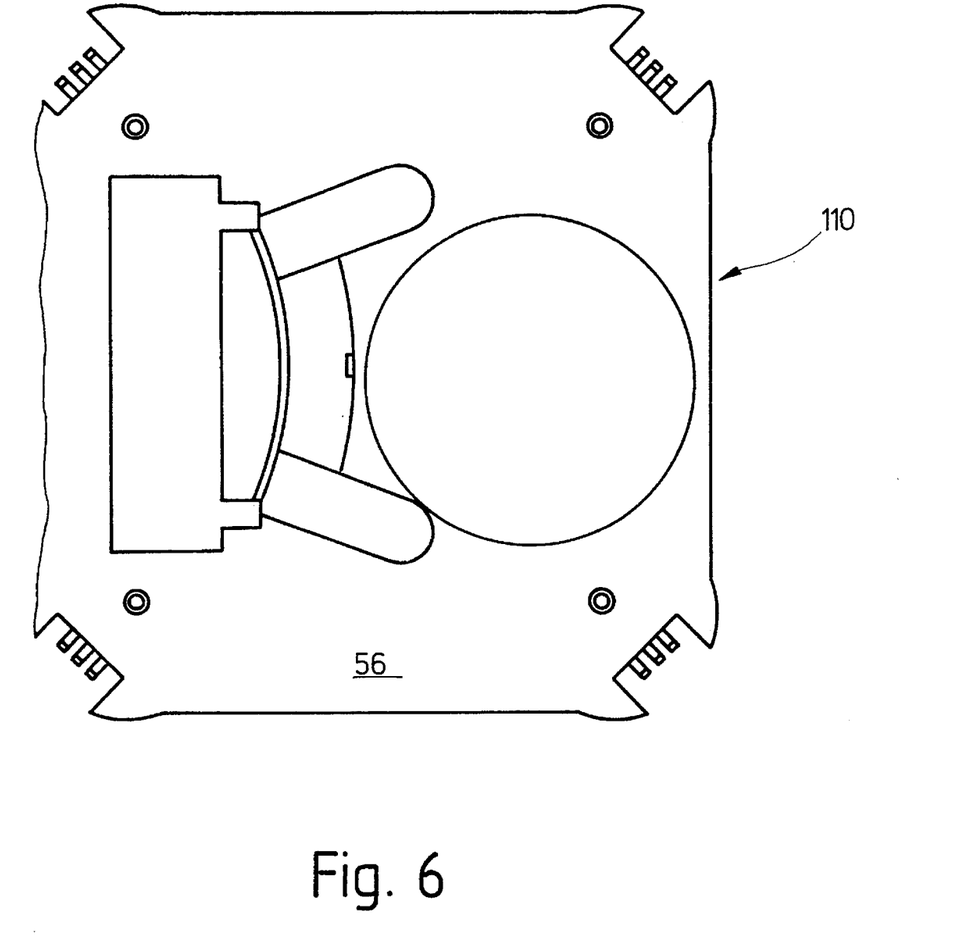
FIG. 6 is a schematic plan view in the direction of the arrow VI in FIG. 4, however with a not inserted closing device.

A filter 110 according to the second embodiment is shown in FIGS. 4–6. It differs from the first embodiment in that in the filter 110 there is no auxiliary housing 22 with all components which perform the above described lifting-lowering operation. The cover 56 can be designed without the part 85. While the cover 56 in the first embodiment is formed of one piece with the part 85, the cover 56 of the second embodiment of FIGS. 4–6 is different in that there is no part 85 in the cover.

The housing 111 of the filter 110 in accordance with the second embodiment differs from the housing 11 of the first embodiment in that, in the region of the bottom chamber 49, the first connecting part 34 and the second connecting part 35 are dispensed with. In other aspects, the housing 111 corresponds to the housing of the first embodiment, so that it is not described in detail to avoid repetitions. This is true for the cover 56 and the filter 110 shown in FIGS. 4–6. The latter is placed on the lower part 55 in a position which is turned by 180° in the cover plane, when compared with the first embodiment. A filter plate 186 is inserted in the housing 111 above under the space 84 and can be formed for example as a perforated plate 186, a grate plate and the like, to cover the uppermost filter compartment 12.

The filter 110 in accordance with the second embodiment does not operate in accordance with the lifting-lowering principle, but instead operates differently than the filter 10. The supply 15 in the filter 110 is formed by a passage 183 which passes through the filter compartments 12, 13, 14 and is closed relative to them. It opens in the bottom chamber 49 located under the lowermost filter compartment 14. The aspiration of the supplied water is performed here from below and from the bottom chamber 49 through the lower filter compartment 14, the next filter compartment 13, and through the upper filter compartment 12 upwardly in correspondence with the arrows. The water is filtered on its way through the corresponding filter compartments 4, 13, 12.

With the cover 56 turned by 180° in the cover plane, this operation is performed in that in this position at least one suction opening 66 shown in FIG. 4 in the cover wall 64 opens freely into the space 84, and the water is aspirated from it after passing the filter compartments 14, 13, 12 and the filter plate 186.

When compared with the first embodiment, this is obtained in that the pipe which is connected with at least one suction opening 66 of the first embodiment is dispensed with in the filter 110.

With the cover 56 in its position turned by 180°, the supply 15 is formed as follows. The supply opening 68 in the cover wall 64 has a special pipe 187 which is for example inserted in it. The pipe 167 extends into the tubular passage 183 formed by the pipes 80, 81, 82 of the compartments 12, 13, 14 which are seated over one another. In this way the supply 15 extending from above downwardly through the filter compartments 12, 13, 14 is provided as shown in FIGS. 4 and 5. It is closed from the surrounding area and leads to the bottom chamber 49.

Since in the filter 110 in accordance with the second embodiment there is no ventilation pipe 39 in the region of the lower part 55 and in the cover 56 the ventilation passage 69 is not needed, it can be blocked by the mentioned blind plug 71 or in another way, for example simultaneously with the molding of the cover 56 or the connecting device 168. This differs from the connecting device 78 of the first embodiment in that a special hose connection for producing the connection to the ventilation pipe 77 and the ventilation passage 69 can be dispensed with.

Air which must collect in the space 84 under the cover wall 64 is forced with the increasing water level in the housing 111 positively due to the inclined construction of the cover wall 64 in FIG. 4 to the right and into the region in which at least one suction conduit 66 is located. It communicates with the outlet passage 65 as a part of the suction conduit 18. It is therefore guaranteed that the air accumulated in the space 84 is always aspirated through the outlet passage 65 of the suction conduit 18 and escapes outwardly.

It will be understood that each of the elements described above, or two or more together, may also find a useful application in other types of constructions differing from the types described above.

While the invention has been illustrated and described as embodied in a filter for aquariums, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A filter for aquarium, comprising a housing with at least one filter compartment for a filter material; a supply through which water is supplied from above into said filter compartment; a pump which aspirates water after passing through said filter compartment through a suction conduit and supplies the water back into an aquarium; at least one auxiliary chamber supplied with water and having an outlet; a float-controlled valve device controlling said outlet of said auxiliary chamber and being in fluid communication with said suction conduit; an auxiliary housing in which said auxiliary chamber is provided, said auxiliary chamber being supplied with water which has been filtered after passing through said filter compartment, said valve device being provided with a float-controlled valve closing member; and a passage which is connected with said suction conduit and has a valve opening which is alternatingly closeable and openable by said valve closing member of said valve device.

2. A filter as defined in claim 1, wherein said auxiliary chamber has at least one supply opening for providing fluid communication of said auxiliary chamber with an interior of said housing and supplying a filtered water.

3. A filter as defined in claim 2, wherein said supply opening of said auxiliary chamber has a conduit which opens into the interior of said housing under a lowermost one of said filter compartments.

4. A filter as defined in claim 3, wherein said conduit is formed as a cornered tubular part.

5. A filter as defined in claim 3, wherein said conduit is formed as a round tubular part.

6. A filter as defined in claim 3, wherein said passage is formed as a tubular portion and said conduit is formed as a tubular part, said tubular portion and said tubular part being formed of one piece with said auxiliary housing.

7. A filter as defined in claim 6, wherein said tubular portion and said tubular part extend substantially horizontally while a remaining part of said auxiliary housing extends substantially vertically.

8. A filter as defined in claim 6, wherein said housing at an end of said suction conduit is provided with a first connecting part and a second connecting part which is concentric to said first connecting part, said tubular portion and said tubular part being releasably connectable with said connecting parts by plugging in.

9. A filter as defined in claim 8, wherein said tubular portion and said tubular part being releasably connectable with said first and second connecting parts with interposition of a seal.

10. A filter as defined in claim 1, wherein said passage is formed in a cornered tubular portion.

11. A filter as defined in claim 1, wherein said passage is formed in a round tubular portion.

12. A filter as defined in claim 1, wherein said passage is formed in a tubular portion; and further comprising a tubular part which surrounds said tubular portion with a distance from the latter.

13. A filter as defined in claim 1, wherein said passage is formed of one piece with said auxiliary housing.

14. A filter as defined in claim 1, wherein said auxiliary housing is substantially tubular.

15. A filter as defined in claim 1, wherein said auxiliary housing is composed of two coaxial and releasably connectable tubular halves.

16. A filter as defined in claim 1, wherein said auxiliary housing is releasably arranged and connected with said housing.

17. A filter as defined in claim 1, wherein said auxiliary housing has an upper region provided with a ventilation opening.

18. A filter as defined in claim 17, wherein said housing has a ventilation pipe provided with said ventilation opening, said auxiliary housing being connectable with said ventilation opening of said ventilation pipe which leads into an interior of said housing.

19. A filter as defined in claim 1, wherein said passage has a wall, said ventilation opening being formed in said wall of said passage.

20. A filter as defined in claim 1, wherein said passage has at least one bypass opening for providing permanent fluid communication of said passage with said auxiliary chamber in said auxiliary housing to determine a minimal water suction.

21. A filter as defined in claim 20, wherein at least one of said valve opening and said passage has a throughflow cross-section which is greater than a throughflow cross-section of said bypass opening.

22. A filter as defined in claim 21; and further comprising a float which control said valve closing member, said float being formed as a cylindrical body floatingly located in said auxiliary chamber.

23. A filter as defined in claim 22, wherein said cylindrical body has a cross-section which is smaller than a cross-section of a cylindrical inner space of said auxiliary housing.

24. A filter as defined in claim 1; and further comprising a float which controls said valve closing member and a support which is coaxial with said float and carries said valve closing member which is formed as a coaxial cylinder element.

25. A filter as defined in claim 24; and further comprising a guide element located near said cylinder element in a cylindrical inner space of said auxiliary housing.

26. A filter as defined in claim 25, wherein said guide element is formed as a guiding disc.

27. A filter as defined in claim 25, wherein said auxiliary housing is tubular and is provided with an inner guiding location for guiding one of said float and said guiding element.

28. A filter as defined in claim 1, wherein said housing has a bottom chamber provided under a lowermost one of said filter compartments so that filtered water after passing through said filter compartments is supplied to said bottom chamber.

29. A filter as defined in claim 28, wherein said auxiliary chamber and said auxiliary housing are in fluid communication with said bottom chamber.

30. A filter as defined in claim 1, wherein each of said filter compartments has a bottom formed as a filtering element.

31. A filter as defined in claim 30, wherein said bottom is provided with throughgoing openings.

32. A filter as defined in claim 31, wherein said bottom is formed as a grate.

33. A filter as defined in claim 1; and further comprising a bottom chamber provided in said housing; and a heating device arranged in said bottom chamber.

34. A filter as defined in claim 33, wherein said heating device is formed as a heating cartridge.

35. A filter as defined in claim 33, wherein said housing has at least one hollow chamber arranged at a height of said bottom chamber on an outer peripheral side and closeable by a cap, said heating device having a holder receivable in said hollow chamber.

36. A filter as defined in claim 35; and further comprising a control device receivable in said hollow chamber.

37. A filter as defined in claim 1, wherein said housing has at least one hollow chamber arranged at a height of said bottom chamber on an outer peripheral side and closeable by a cap, said heating device having a holder receivable in said hollow chamber.

38. A filter as defined in claim 37; and further comprising a control device receivable in said hollow chamber.

39. A filter as defined in claim 1, wherein said housing has a substantially cup-shaped lower part, said filter compartment being insertable into said lower part and held releasably in it.

40. A filter as defined in claim 1, wherein said housing has a substantially cup-shaped lower part, said filter compartment being insertable into said lower part and held releasably in it.

41. A filter as defined in claim 1, wherein said housing has a lower part and a cover which is placed on said lower part from above and is releasably fixable to said lower part.

42. A filter as defined in claim 41, wherein said cover is releasably connectable with said lower part by a closing member arranged on said lower part.

43. A filter as defined in claim 41; and further comprising an axially compressible seal arranged between said cover and said lower part.

44. A filter as defined in claim 43, wherein said cover has a groove which is open toward said lower part and receives said sealing, and in which an upper edge part of said lower part engages.

45. A filter as defined in claim 41, wherein said cover and said lower part has a substantially four-cornered profile.

46. A filter as defined in claim 41, wherein said cover, said lower part and said auxiliary housing are composed of synthetic plastic material.

47. A filter as defined in claim 1, wherein said housing has a lower part and a cover which is placed on said lower part from above and is releasably fixable to said lower part.

48. A filter as defined in claim 47, wherein said cover is releasably connectable with said lower part by a closing member arranged on said lower part.

49. A filter as defined in claim 48; and further comprising an axially compressible seal arranged between said cover and said lower part.

50. A filter as defined in claim 49, wherein said cover has a groove which is open toward said lower part and receives said sealing, and in which an upper edge part of said lower part engages.

51. A filter as defined in claim 47, wherein said cover and said lower part has a substantially four-cornered profile.

52. A filter as defined in claim 47, wherein said cover, said lower part and said auxiliary housing are composed of synthetic plastic material.

53. A filter as defined in claim 1, wherein said housing has a lower part and a cover which closes said lower part, said cover containing at least a part of said suction conduit.

54. A filter as defined in claim 1, wherein said housing has a lower part and a cover which closes said lower part, said cover containing at least a part of said suction conduit.

55. A filter as defined in claim 1, wherein said housing has a lower part and a cover closing said lower part from above; and further comprising a pump with an impeller and an electric motor for driving said pump, said impeller of said pump being located in said suction conduit.

56. A filter as defined in claim 1, wherein said housing has a lower part and a cover closing said lower part from above; and further comprising a pump with an impeller and an electric motor for driving said pump, said impeller of said pump being located in said suction conduit.

57. A filter as defined in claim 1, wherein said housing has a lower part and a cover which closes said lower part from above, said cover has a lower side provided with a substantially horizontal outlet passage forming a part of said suction conduit.

58. A filter as defined in claim 57, wherein said cover has a cover wall which limits said lower side of said cover and is provided in a region above said impeller of said pump with at least one suction opening which is in fluid communication with an outlet passage of said suction conduit.

59. A filter as defined in claim 58, wherein said cover wall inclinedly rises from an outer side to at least said suction opening.

60. A filter as defined in claim 58, wherein said cover has a supply passage which opens in a supply opening provided in said cover wall.

61. A filter as defined in claim 58, wherein said cover has a cover lower side with a ventilating passage which in a position of non-use is closeable and provided with an end-side ventilation opening which is formed in said cover wall and opens in it.

62. A filter as defined in claim 58; and further comprising a pipe which is connected with said suction opening in said cover wall and passes through said filter compartment so as to be closed relative to said filter compartment and to form a part of said suction conduit, said pipe having an end which is connected with one part of said housing and communicates with said passage.

63. A filter as defined in claim 58, wherein said cover wall has a supply opening which opens into a space provided between said cover wall and said lower part so that water is supplied from above to said filter compartment.

64. A filter as defined in claim 1, wherein said housing has a lower part and a cover which closes said lower part from above, said cover has a lower side provided with a substantially horizontal outlet passage forming a part of said suction conduit.

65. A filter as defined in claim 64, wherein said cover has a cover wall which limits said lower side of said cover and is provided in a region above said impeller of said pump with at least one suction opening which is in fluid communication with an outlet passage of said suction conduit.

66. A filter as defined in claim 65, wherein said cover wall inclinedly rises from an outer side to at least said suction opening.

67. A filter as defined in claim 65, wherein said cover has a supply passage which opens in a supply opening provided in said cover wall.

68. A filter as defined in claim 65, wherein said cover has a cover lower side with a ventilating passage which in a position of non-use is closeable and provided with an end-side ventilation opening which is formed in said cover wall and opens in it.

69. A filter as defined in claim 65; and further comprising a pipe which is connected with said suction opening in said cover wall and passes through said filter compartment so as to be closed relative to said filter compartment and to form a part of said suction conduit, said pipe having an end which is connected with one part of said housing and communicates with said passage.

70. A filter as defined in claim 65, wherein said cover wall has a supply opening which opens into a space provided between said cover wall and said lower part so that water is supplied from above to said filter compartment.

71. A filter as defined in claim 1, wherein said cover has at least one of an outlet passage, a supply passage and a ventilating passage each provided with a receptacle for connecting at least one of an outlet pipe, a supply pipe and a ventilation pipe.

72. A filter as defined in claim 1, wherein said cover has at least one of an outlet passage, a supply passage and a ventilating passage each provided with a receptacle for connecting at least one of an outlet pipe, a supply pipe and a ventilation pipe.

73. A filter as defined in claim 1, wherein said housing has a lower part and a cover which is placed on said lower part in one position or in a position which is turned relative to said one position by 180°.

* * * * *